United States Patent [19]

Chau et al.

[11] Patent Number: 5,743,633
[45] Date of Patent: Apr. 28, 1998

[54] BAR CODE ILLUMINATOR

[75] Inventors: Chiu W. Chau, Buena Park; Jeremy M. Lerner, Culver City, both of Calif.

[73] Assignee: Physical Optics Corporation, Torrance, Calif.

[21] Appl. No.: 579,312

[22] Filed: Dec. 27, 1995

[51] Int. Cl.⁶ ............................................. E21V 5/04
[52] U.S. Cl. .............. 362/331; 362/268; 362/326; 362/336; 359/15; 359/599; 359/707; 235/462
[58] Field of Search ................... 235/454, 455, 235/462, 467; 359/28, 599, 707, 737, 15, 22, 443; 362/244, 246, 268, 326, 331, 332, 336–340

[56] References Cited

U.S. PATENT DOCUMENTS

| | | | |
|---|---|---|---|
| 3,302,016 | 1/1967 | Larraburu | 359/707 |
| 3,711,777 | 1/1973 | Ward | 359/28 |
| 3,851,093 | 11/1974 | Sunstein | 359/707 |
| 4,345,308 | 8/1982 | Mouyard et al. | 362/332 |
| 4,743,773 | 5/1988 | Katana et al. | 235/472 |
| 5,010,241 | 4/1991 | Butterworth | 235/462 |
| 5,365,354 | 11/1994 | Jannson et al. | 359/15 |
| 5,386,105 | 1/1995 | Quinn et al. | 235/462 |
| 5,484,994 | 1/1996 | Roustaei | 235/462 |
| 5,534,386 | 7/1996 | Petersen et al. | 359/15 |
| 5,600,116 | 2/1997 | Seo et al. | 235/455 |
| 5,609,939 | 3/1997 | Petersen et al. | 359/15 |

*Primary Examiner*—Alan Cariaso
*Attorney, Agent, or Firm*—Nilles & Nilles, S.C.

[57] ABSTRACT

Systems and methods for illuminating bar codes are described. A bar code illuminator includes a first light source and a first light transformer optically connected to the first light source; the first light transformer including a first light shaping diffuser and a first lens optically connected to the light shaping diffuser. The systems and methods are advantageous in that a bar code illuminator is provided with a wide angle capability that may be compact and inexpensive.

21 Claims, 2 Drawing Sheets

5,743,633

BAR CODE ILLUMINATOR

BACKGROUND OF THE INVENTION

1. Field of the Invention

The present invention relates generally to the field of bar code recognition systems. More particularly, the present invention concerns bar code illuminators. Specifically, a preferred embodiment of the present invention is directed to a bar code illuminator that includes a light shaping surface diffuser. The present invention thus relates to bar code illuminators of the type that can be termed light shaping.

2. Discussion of the Related Art

Historically, it was known in the prior art to provide a bar code illuminator as part of a bar code recognition system. One type of conventional bar code recognition system uses point illumination and point reading. This type of bar code recognition system often includes a bar code illuminator that is swept along a bar code. For example, a bar code illuminator that is part of such a bar code recognition system can be placed adjacent a bar code and manually swept back and forth across the bar code until the bar code is successfully processed by the bar code recognition system. Alternatively, the bar code illuminator can remain stationary and the bar code itself can be swept back and forth across the bar code illuminator until the code is successfully processed by the bar code recognition system.

A previously recognized problem has been that such bar code illuminators require relative physical displacement to illuminate the entire bar code. One unsatisfactory previously recognized solution to this problem was to provide a bar code illuminator that includes a laser scanner. With this type of bar code illuminator the laser is scanned across the bar code. Thus, this type of bar code illuminator does not have to be swept along the bar code.

These laser scanner illuminators can use a laser (e.g., helium neon), a vibrating or rotating mirror and collecting optics that are provided in a single photocell. The laser emits light of, for example, 632.8 nanometer wavelength, toward the vibrating or rotating mirror and the light scans across the bar code. A single detector responds to changes in intensity when the black/white bars are scanned. The detector reads the reflected signal from the bar code. This type of laser scanner illuminator still uses point illumination and point reading. An advantage of this type of laser scanner illuminator system is the availability of high power for outdoor use or the ability for utilization with a bright background. A disadvantage of this type of laser scanner illuminator system is that moving parts are involved. Another disadvantage of this system is that the attendant high-power levels tend to create eye-safety problems. Another disadvantage of this system is that such laser scanner illuminator systems are bulky. Yet another disadvantage of this solution is that such laser scanner illuminator systems are slow.

Another unsatisfactory, previously recognized solution to the problem of bar code illuminators requiring relative physical displacement was to provide a bar code illuminator that includes multiple light-emitting diodes (LED) with mirrors or lenses. The light emitted goes to either multiple lenses, or a single, large optic, to spread the light onto the width of the entire bar code. (Such bar codes are typically about three inches wide.) A charged complete device (CCD) then reads the entire width of the bar code. With this type of system it is necessary to have a uniform line illumination across the bar code for accurate readout. An advantage of this system is that it requires low power. An additional advantage of this system is that there are no moving parts. Additional advantages of this system are that such illuminators cost less than comparable laser scanner systems and are compact. A disadvantage of this system is that the multiple light-emitting diodes must be matched in brightness. An additional disadvantage of this system is that it requires complex optics. An additional disadvantage of this system is that there is typically a non-uniform light output from the multiple lenses, or single, large optic. An additional disadvantage of this system is that the data processing through-put is not good because the system tries to compromise uniformity and line spread.

What is needed therefore is a compact, inexpensive, wide angle uniform capability bar code illuminator. Heretofore, these apparently conflicting requirements have not been met.

The disclosures of all the below-referenced prior United States patents, and applications, in their entireties are hereby expressly incorporated by reference into the present application for purposes including, but not limited to, indicating the background of the present invention and illustrating the state of the art. U.S. Pat. No. 5,365,354 discloses a volume holographic diffuser. U.S. Ser. No. 08/097,953 now U.S. Pat. No. 5,534,386 which was subsequently abandoned in favor of continuation Ser. No. 08/393,050 discloses a light source destructuring and shaping device. U.S. Ser. No. 08/097,533 now U.S. Pat. No. 5,609,939 which was subsequently abandoned in favor of continuation Ser. No. 08/355,818 discloses a high brightness directional viewing screen.

SUMMARY OF THE INVENTION

The above-mentioned requirements of compactness, low cost and wide angle capability are apparently mutually contradicting and cannot be simultaneously satisfied in the case of a conventional bar code illuminator. However, it is rendered possible to simultaneously satisfy these requirements by employing a light shaping diffuser together with a light source and a lens in consideration of the fact that the light shaping diffuser, in conjunction with the lens, can transform light from the light source to effectively illuminate a bar code across a wider angle. Thereby, the present invention provides wide angle capability together with compactness and low cost by combining a single light source, a single light shaping diffuser, and a single lens, in a bar code illuminator. An effect of the present invention is to generate a zone of illumination that is tailored to a specific bar code geometry.

It is therefore an object of the invention to provide a bar code illuminator having a wide angle capability. Another object of the invention is to provide a bar code illuminator that is compact and inexpensive. Another object of the invention is to provide an apparatus that is ruggedized and reliable, thereby decreasing down time and operating costs. Another object of the invention is to provide an apparatus that has one or more of the characteristics discussed above but which is relatively simple to manufacture and assemble using a minimum of equipment.

In accordance with a first aspect of the invention, these objects are achieved by providing an apparatus comprising: I) a first means for emitting light; and II) a first means for transforming light optically connected to said first means for emitting light, said first means for transforming light including: A) a first means for shaping light; and B) a first means for changing the divergence of light optically connected to said first means for shaping light. In one embodiment, the apparatus further comprises: I) a second means for emitting light; and II) a second means for transforming light optically connected to said second means for emitting light, said second means for transforming light including: A) a second means for shaping light; and B) a second means for changing the divergence of light optically connected to said second means for shaping light. In a preferred embodiment, said first light shaping diffuser and said first lens compose a unitary optical element.

Another object of the invention is to provide a method of illuminating a bar code that is predictable and reproducible, thereby decreasing variance and operating costs. Another object of the invention is to provide a method of illuminating a bar code that is quick and inexpensive, thereby increasing efficiency. Another object of the invention is to provide a method that has one or more of the characteristics discussed above but which is relatively simple to setup and operate using relatively low skilled workers.

In accordance with another aspect of the invention, these objects are achieved by providing a method of illuminating a bar code comprising: I) providing a bar code; II) providing a bar code illuminator with A) a light source; and B) a light transformer optically connected to said light source, said light transformer including: 1) a light shaping diffuser; and 2) a lens optically connected to said light shaping diffuser; and III) illuminating said bar code with light from said bar code illuminator. In a preferred method, providing a bar code illuminator includes forming a unitary optical element that includes said light shaping diffuser and said lens.

Other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DESCRIPTION OF PREFERRED EMBODIMENTS

Figure 1:
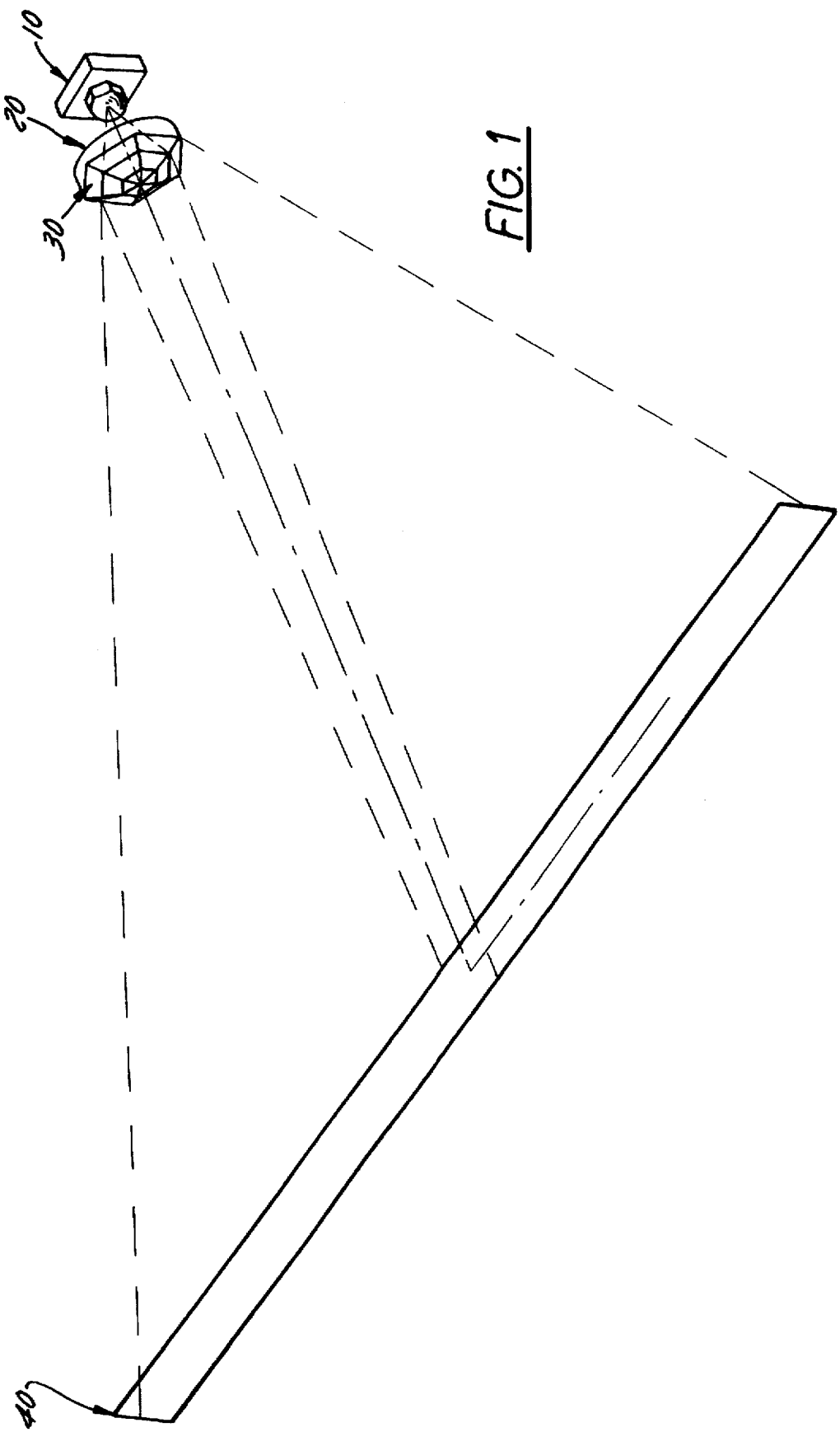
FIG. 1 illustrates a perspective view of elements of a bar code illuminator according to the present invention.

The present invention and the various features and advantageous details thereof are explained more fully with reference to the non-limiting embodiments described in detail in the following description.

1. System Overview

The present invention is directed to a bar code illuminator that includes a light-emitting diode, a lens and a light-shaping diffuser. The light-emitting diode preferably emits red wavelength light. The lens can be a spherical, or an aspheric, or a toric, or a cylindrical design. The light-shaping diffuser can be either a light-shaping surface diffuser or a light-shaping volume diffuser (taken from Petersen et al. U.S. Pat. No. 5,534,386 column 1, line 25 to column 2, line 25 and column 5, line 46 to column 6, line 25):

A light source destructuring and shaping device (light shaping diffuser) is presented. More specifically, a device which both homogenizes and imparts predetermined directionality to light rays emanating from a light source is disclosed. The device of the present invention comprises a micro-sculpted surface structure which controls the direction in which light propagates in either reflection or transmission. The sculpted surface structure also homogenizes light propagating through it with predetermined directionality. The device may be used in an almost unlimited number of applications which require homogenization and which would benefit from being able to impart directionality to light waves emanating from a light source. These applications include existing diffuser applications and applications wherein it was not practical to use conventional diffusers. The homogenizing and shaping device (light shaping diffuser) of the present invention achieves these benefits with very high transmission or reflection efficiency and with reduced side lobes.

A method by which the device of the present invention is made comprises the steps of generating a surface structure in a photosensitive medium using coherent light, processing the medium, and replicating the surface structure in, for example, epoxy. The surface structure may be generated in the photosensitive medium by exposing it to coherent light which has been diffused. The light may be diffused by a ground glass, holographic, lenticular, or acetate diffuser, for example. The photosensitive medium may comprise, for example, dichromated gelatin, photoresist, silver halide, or photopolymer. Once the photosensitive medium is recorded and processed, any of a number of types of epoxy, or its equivalent, may be applied thereto to transfer the surface structure into the epoxy, which, when cured, may be separated from the medium. The cured epoxy layer may be used, as is, in a transmission application, or coated with a reflective material for a reflection application. For mass production, the epoxy layer may be subjected to electroform processes, or its equivalent, to create a metal master from which plastic, or other embossable materials, may be imprinted with the sculpted surface structure.

The surface structure of the device of the present invention controls directionality of light waves emanating from a light source in such a way that light may be directed into well defined fields of view. Furthermore, brightness or gain (number of photons per unit area) in this field of view is significantly increased because of the highly efficient surface structure of the device and because the light is not directed to areas where it is not desired. The applications of the device, of the present invention are virtually unlimited.

A related set-up for recording volume holographic diffusers is described in application Ser. No. 848,703, filed, Mar 9, 1992, now U.S. Pat. No. 5,365,354, having a common assignee. According to that disclosure, recording a holographic plate with coherent laser light passed through a conventional ground glass diffuser generates features called speckle in the volume of the hologram. The size, shape, and orientation of the speckle can be adjusted which in turn affects the angular spread of light scattered from the holographic diffuser upon playback. Generally, the size of the angular spread of the scattered light, in other words, the angular distribution of the scattered light, depends on the average size and shape of the speckle. If the speckle are small, angular distribution will be broad. If the speckle size is horizontally elliptical, the shape of the angular distribution will be vertically elliptical. Thus, it is desirable to control the size and shape of speckle recorded in the medium so that, upon playback, the correct output or angular spread is produced.

Speckle size is inversely proportional to the size of the aperture of the master diffuser. If the size of the aperture increases, the size of the speckle decreases and the size of the angular spread of the scattered light from the recorded photosensitive medium increases. Conversely, if the size of the master diffuser aperture decreases, the size of the speckle recorded in the diffuser increases and the angular spread of light scattered from the recorded photosensitive medium decreases. Thus, if the master diffuser aperture is long and narrow, the speckle will be long and narrow as well with their axes oriented perpendicularly to the axis of the aperture. This holds true for both volume holographic recording media as well as surface holographic recording media.

Diffusers made from volume holographic recording media as in Ser. No. 848,703, however, are disclosed there for their volume effect. In other words, the speckle recorded in the interior or volume of the medium was thought the only desired effect to be obtained from the material. However, since then we have discovered that recording a volume holographic angular spread such as DCG (dichromated gelatin) in a similar recording set-up produces a surface effect of peaks and valleys which may be replicated, as described more fully in U.S. Pat. No. 5,534,386.

The light source, the lens and the light-shaping diffuser can be arranged so that the optical path is from the light-emitting diode through the lens and then through the light-shaping diffuser. Alternatively, these components can be arranged so that the light path is from the light-emitting diode (LED) through the light-shaping diffuser and then through the lens.

For comparison, it should be appreciated that if light were emitted from the light-emitting diode and merely collected by the lens, the light would be focused onto a small spot (about 0.3 inches in diameter) at a targeted area, which is typically seven inches away front the illuminator. By putting the light-shaping diffuser in between the LED and the lens, or alternatively between the lens and the target area, the spot becomes a line. For example, a line that is approximately six inches wide by approximately 0.3 inches high.

2. Detailed Description of Preferred Embodiments

Referring to the drawings, it can be seen that the bar code illuminator generates a wide angle, low profile zone of illumination that extends out toward a target area. Pursuant to the present invention, the light source, the light shaping diffuser and the lens are all chosen so as to generate a zone of illumination having a geometry at the target area that is appropriate for use with bar codes of a predetermined approximate width and approximate height. Of course, given a bar code illuminator of fixed optical configuration, the width and height of the geometry of the zone of illumination at the target area is a function of the distance to the target.

Referring to FIG. 1, light-emitting diode 10 is a preferred light source. Light from light-emitting diode 10 travels toward light-shaping diffuser 20. The light then travels toward lens 30. The light then travels toward target area 40.

Although the preferred embodiment shown in FIG. 1 includes a rectangular output light shaping diffuser that generates a rectangular illumination zone that is optimized to enable reading of a one-dimensional bar code at target area 40, it is within the level of ordinary skill in the art after having knowledge of the invention disclosed herein to use an approximately square output light shaping diffuser in order to generate an approximately square illumination zone that is optimized for enabling the reading of a two-dimensional bar code.

Figure 2:
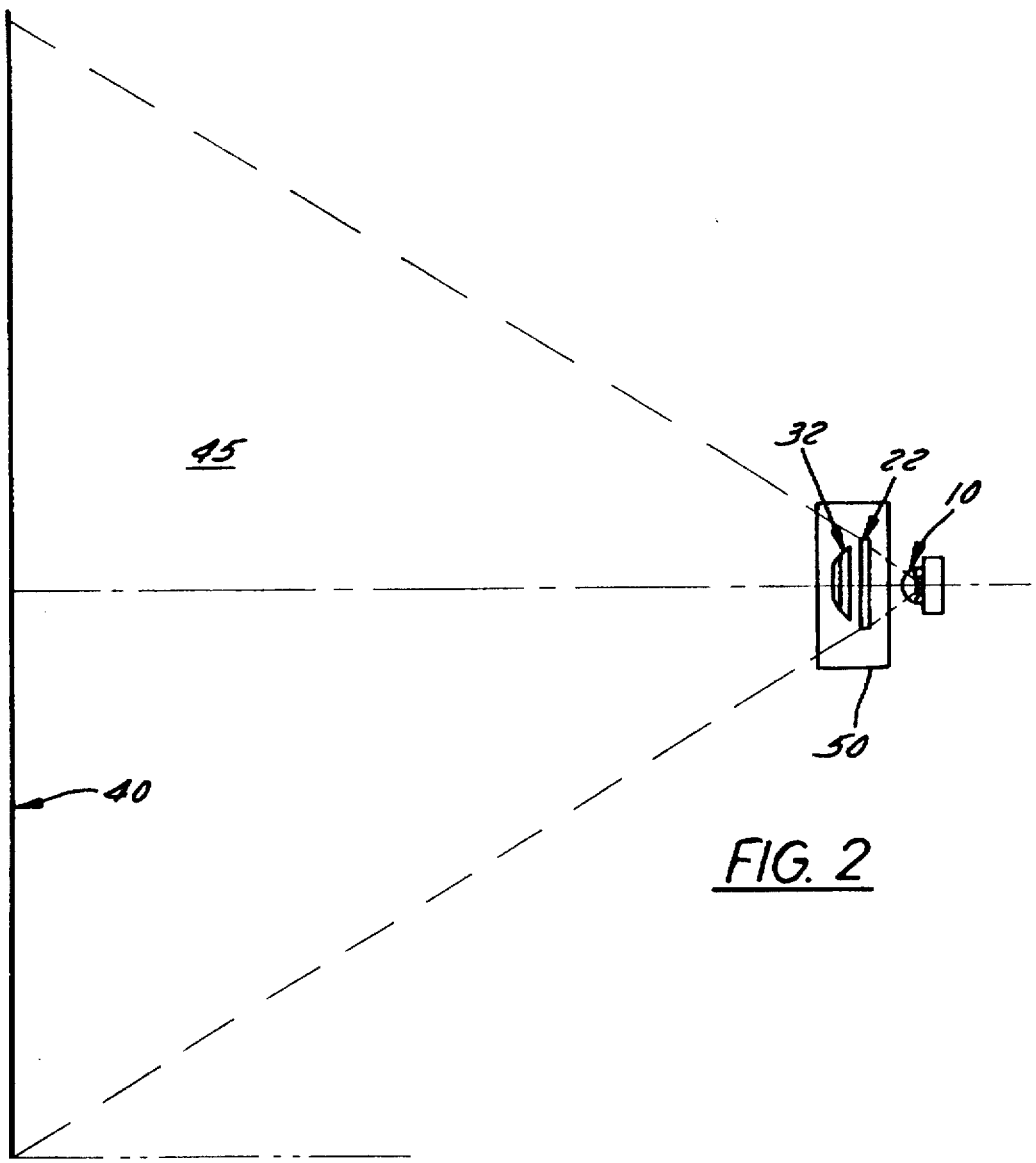
FIG. 2 illustrates a top plan view of elements of a bar code illuminator according to the present invention.

Referring now to FIG. 2, this top plan view shows light from light-emitting diode 10 traveling toward light-shaping diffuser 22. In this embodiment, light-shaping diffuser 22 is physically separated from, but optically connected to lens 32. Light from light-shaping diffuser 22 travels through lens 32 toward target area 40. From this perspective, zone of illumination 45 appears to be triangular. Together, light shaping diffuser 20 and lens 30 compose a light transformer 50.

Although the preferred embodiment shown in FIG. 2 discloses a light shaping diffuser 22 located between the light-emitting diode 10 and the lens 32, it is within the level of ordinary skill in the art after having knowledge of the invention disclosed herein to substitute for lens 32 a lens of different design located between light-emitting diode 10 and the light shaping diffuser 22.

Figure 3:
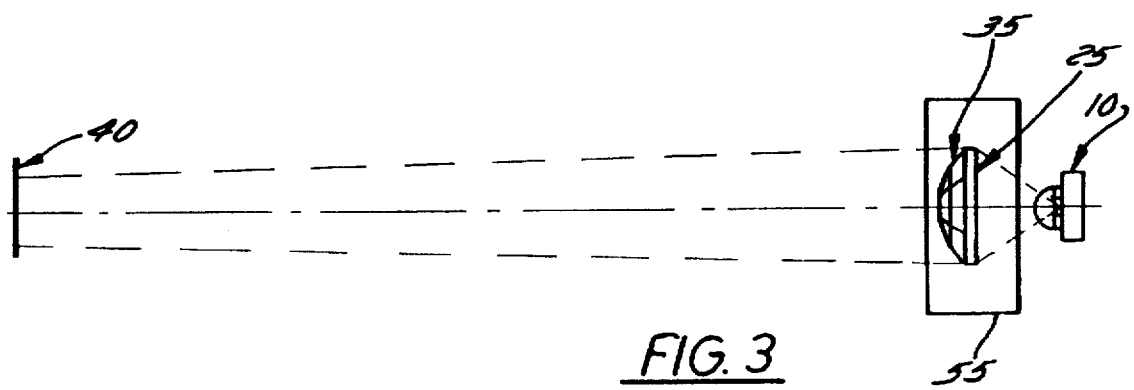
FIG. 3 illustrates an elevational view of elements of a bar code illuminator according to the present invention.

Turning now to FIG. 3, this side view shows light from light-emitting diode 10 traveling toward light transformer 55. In this embodiment, light transformer 55 is a unitary optical element. Light transformer 55 includes a light-shaping diffuser element 25 and a lens element 35. Light from light-emitting diode 10 travels through light-shaping diffuser element 25 and then through lens element 35 on its way toward target 40.

Although the preferred embodiment shown in FIG. 3 includes one light-emitting diode 10 and one light transformer 55, it is within the level of ordinary skill in the art after having knowledge of the invention disclosed herein to use a plurality of light-emitting diodes together with a plurality of light transformers, or a plurality of light shaping diffusers and a plurality of lenses.

The disclosed embodiments show a light-emitting diode as the structure for performing the function of emitting light, but the structure for emitting light can be any other structure capable of performing the function of emitting light, including, by way of example other types of lasers, such as a gas laser, or align-monochromatic light source, such as a strobe light.

The disclosed embodiments show a light shaping diffuser as the structure for performing the function of shaping light, but the structure for shaping light can be any other structure capable of performing the function of shaping light, including, by way of example, a lens such as a fresnel lens.

The disclosed embodiments show a lens as the structure for performing the function of changing the divergence of light, but the structure for changing the divergence of light can be any other structure capable of performing the function of changing the divergence light, including, by way of example a nonlinear optic such as a convection chamber.

The target area geometry is a function of the distance from the lens (or light-shaping diffuser) to the target (e.g., typically seven inches). The resulting illuminated zone is preferably wide horizontally and preferably narrow vertically so that a one-dimensional bar code illuminator according to the present invention can be a hand-held, pencil-sized shaped unit.

In designing the components of the bar code illuminator, one must consider where the end-user needs the bar code to be in focus. Knowing the output characteristics of a given LED, the lens and light-shaping diffuser characteristics are then chosen. Every LED emits a certain characteristic cone of light. Using classical physics, focal length of the lens can be chosen to get the focal plane where it is desired. Knowing the desired distance from the lens to the target and the anticipated size of the bar code, you can determine how far out the light needs to be spread. This spread determines the appropriate light-shaping diffuser configuration. It should be noted that structural artifacts from the light-emitting diode are advantageously minimized by the light-shaping diffuser.

Knowing the desired distance from the bar code illuminator to the target area, the appropriate geometry for the positioning of the lens and LED can be easily approximated based on the focal length of the lens. This relationship is expressed by $$\frac{1}{F} = \frac{1}{P} + \frac{1}{Q}$$

where F is the focal length of the lens, P is the image-distance of the lens and Q is the object-distance of the lens.

While the lens and light-shaping diffuser can be provided as separate optical elements, it is preferred that they compose a single unitary optical element. This single unitary optical element can be fabricated according to several techniques.

Conveniently, the physically separate lens and light diffuser, or unitary light transformer, of the present invention can be made of any optical material. For the manufacturing operation, it is moreover an advantage to employ a plastic material.

Conveniently, fabrication of the lens and light diffuser shaping, or unitary light transformer, of the present invention can be carried out by using any forming method. For the manufacturing operation, it is moreover an advantage to employ one of several replication methods.

The light-shaping diffuser can be bonded into the lens using epoxy replication techniques. A preferred epoxy replication technique includes the following steps: providing a master which exhibits the light-shaping diffuser pattern as a surface relief; coating the metal master with a release substance; pouring epoxy on top of the release substance so as to fill the metal master; putting a lens into the epoxy; curing the epoxy; and removing the metal master from the resulting light transformer.

The lens and light-shaping diffuser can be injection molded as a single piece. Once again, a metal master embodying the light-shaping diffusing pattern as a surface relief is provided. A nickel electro-form is taken of the metal master surface relief. The nickel electro-form is placed in an injection mold and acts as one of the walls of the mold. A suitable viscous optic material is then injected into the mold.

The lens and light-shaping diffuser can also be cast as a single piece. Such a casting is advantageously made of silicone epoxy glass.

All the disclosed embodiments are useful in conjunction with bar code reader systems such as are used for the purpose of inventory control, or for the purpose of tracking the progress of a package during shipment, or the like. There are virtually innumerable uses for the present invention, all of which need not be detailed here. All the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the amount and type of light available for transforming could be enhanced by providing different types of light sources. Similarly, although a unitary light transformer is preferred for use with the light emitter, any optical assembly could be used in its place. In addition, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, which emit and transform light so as to provide illumination of a bar code. Further, although the bar code illuminator described herein is a physically separate module, it will be manifest that the bar code illuminator may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

What is claimed is:

1. A bar code illuminator comprising:
   I) a first light source; and
   II) a first light transformer optically connected to said first light source, said first light transformer including:
      A) a first light shaping diffuser comprising random, disordered, and non-planar speckle that defines non-discontinuous and smoothly varying changing in the refractive index of the medium of the diffuser, so as to scatter incident collimated light, said speckle being sized, shaped, and oriented so as to shape the angular spectrum of light scattered therefrom; and
      B) a first lens optically connected to said first light shaping diffuser.

2. The bar code illuminator of claim 1, wherein said first light shaping diffuser and said first lens compose a unitary optical element.

3. The bar code illuminator of claim 1, wherein said first light source is a single light-emitting diode.

4. The bar code illuminator of claim 1, wherein said first lens is a diverging lens having a focal length of from approximately 1 to approximately 10.

5. The bar code illuminator of claim 1, wherein said first light shaping diffuser is a light shaping surface diffuser.

6. The bar code illuminator of claim 1, wherein said first light shaping diffuser is located between said first light source and said first lens.

7. The bar code illuminator of claim 1, further comprising
   I) a second light source; and
   II) a second light transformer optically connected to said second light source, said second light transformer including:
      A) a second light shaping diffuser; and
      B) a second lens optically connected to said second light shaping diffuser.

8. An apparatus comprising:
   I) a first light source; and
   II) a first light transformer optically connected to said first light source, said first light transformer including:

A) a first light shaping diffuser comprising random, disordered, and non-planar speckle that defines non-discontinuous and smoothly varying changes in the refractive index of the medium of the diffuser, so as to scatter incident collimated light, said speckle being sized, shaped, and oriented so as to shape the angular spectrum of light scattered therefrom; and B) a first lens for changing the divergence of light optically connected to said first light shaping diffuser.

9. The apparatus of claim 8, wherein said first light shaping diffuser and said first lens for changing the divergence of light compose a unitary optical element.

10. The apparatus of claim 8, wherein said first light source is a single light-emitting diode.

11. The apparatus of claim 8, wherein said first lens for changing the divergence of light is a diverging lens having a focal length of from approximately 1 to approximately 10 inches.

12. The bar code illuminator of claim 8, wherein said first light shaping diffuser is a light shaping surface diffuser.

13. The bar code illuminator of claim 8, wherein said first light shaping diffuser is located between said first light source and said first lens for changing the divergence of light.

14. The apparatus of claim 8, further comprising

I) a second light source; and

II) a second light transformer optically connected to said second light source, said second light transformer including:

A) a second light shaping diffuser; and

B) a second lens for changing the divergence of light.

15. A method of illuminating a bar code comprising:

I) providing a bar code;

II) providing a bar code illuminator with

A) a light source; and

B) a light transformer optically connected to said light source, said light transformer including:

1) a light shaping diffuser comprising random, disordered, and non-planar speckle that defines non-discontinuous and smoothly varying changes in the refractive index of the medium of the diffuser, so as to scatter incident collimated light, said speckle being sized, shaped, and oriented so as to shape the angular spectrum of light scattered therefrom; and 2) a lens optically connected to said light shaping diffuser; and III) illuminating said bar code with light from said bar code illuminator.

16. The method of claim 15, wherein providing a bar code illuminator includes injection molding a unitary optical element that includes said light shaping diffuser and said lens.

17. The method of claim 15, wherein providing a bar code illuminator includes casting a unitary optical element that includes said light shaping diffuser and said lens.

18. The method of claim 15, wherein providing a bar code illuminator includes forming a unitary optical element that includes said light shaping diffuser and said lens.

19. The method of claim 18, wherein forming a unitary optical element includes bonding said lens to said light shaping diffuser.

20. A method of illuminating a bar code comprising:

I) providing a bar code;

II) providing a bar code illuminator with

A) a light source; and

B) a light transformer optically connected to said light source, said light transformer including:

1) a light shaping diffuser; and 2) a lens optically connected to said light shaping diffuser; and III) illuminating said bar code with light from said bar code illuminator, wherein the step of providing a bar code illuminator includes forming a unitary optical element that includes said light shaping diffuser and said lens, and bonding said lens to said light shaping diffuser, wherein the step of bonding said lens to said light diffuser includes providing a diffuser master, coating said diffuser master with a release, pouring an epoxy onto said release, putting said lens into said epoxy, curing said epoxy and removing said master.

21. The bar code illuminator of claim 1, wherein said speckle of said first light shaping diffuser 1) defines non-discontinuous and smoothly varying changes in the refractive index of the light shaping diffuser medium and 2) provides scatter with non-discontinuous reflection of light traveling from a first surface of said first light shaping diffuser to a second surface of said first light shaping diffuser.

* * * * *